United States Patent
Vasseur et al.

(10) Patent No.: US 12,034,605 B1
(45) Date of Patent: Jul. 9, 2024

(54) FEEDBACK LOOP CONTROL OF AN ONLINE APPLICATION BASED ON NETWORK CHARACTERISTICS AFFECTING USER EXPERIENCE

(71) Applicant: Cisco Technology, Inc., San Jose, CA (US)

(72) Inventors: Jean-Philippe Vasseur, Combloux (FR); Pierre-André Savalle, Rueil-Malmaison (FR); Eduard Schornig, Haarlem (NL); Grégory Mermoud, Venthône (CH); Michal Wladyslaw Garcarz, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/198,583

(22) Filed: May 17, 2023

(51) Int. Cl.
*H04L 41/147* (2022.01)
*H04L 41/16* (2022.01)

(52) U.S. Cl.
CPC .......... *H04L 41/147* (2013.01); *H04L 41/16* (2013.01)

(58) Field of Classification Search
CPC .............................. H04L 41/147; H04L 41/16
See application file for complete search history.

(56) References Cited

U.S. PATENT DOCUMENTS

| | | | |
|---|---|---|---|
| 10,708,144 B2 * | 7/2020 | Mohan | H04L 41/5009 |
| 11,296,991 B2 * | 4/2022 | Dhanabalan | H04L 45/70 |
| 11,398,959 B2 | 7/2022 | Yelahanka Raghuprasad et al. | |
| 2016/0165059 A1 * | 6/2016 | Deng | H04L 41/5025 370/254 |
| 2017/0186019 A1 * | 6/2017 | Loeb | G07F 17/3227 |
| 2018/0183660 A1 * | 6/2018 | Byers | H04L 41/0803 |
| 2020/0358668 A1 * | 11/2020 | Kumaran | H04L 41/40 |
| 2021/0064996 A1 * | 3/2021 | Wang | H04W 24/08 |
| 2022/0030087 A1 * | 1/2022 | Chatterjee | H04L 41/149 |
| 2022/0052927 A1 * | 2/2022 | Yelahanka Raghuprasad | H04L 41/5025 |
| 2022/0060393 A1 * | 2/2022 | Vasseur | H04L 41/5025 |
| 2022/0311674 A1 * | 9/2022 | Erta | H04L 41/145 |
| 2022/0377844 A1 * | 11/2022 | Kumar | H04W 88/08 |
| 2023/0018772 A1 | 1/2023 | Kolar et al. | |
| 2023/0129290 A1 * | 4/2023 | Kolar | H04L 41/5009 709/224 |

* cited by examiner

*Primary Examiner* — Alina A Boutah
(74) *Attorney, Agent, or Firm* — BEHMKE INNOVATION GROUP LLC; James M. Behmke; James J. Wong

(57) ABSTRACT

In one embodiment, a device obtains a set of one or more configuration parameters of an online application accessed by a plurality of clients via a network. The device obtains path information regarding paths in the network via which the plurality of clients accesses the online application. The device determines an updated configuration parameter predicted by a prediction model to increase application experience of the online application based on the path information and the set of one or more configuration parameters. The device provides the updated configuration parameter for use by the online application.

14 Claims, 9 Drawing Sheets

FEEDBACK LOOP CONTROL OF AN ONLINE APPLICATION BASED ON NETWORK CHARACTERISTICS AFFECTING USER EXPERIENCE

TECHNICAL FIELD

The present disclosure relates generally to computer networks, and, more particularly, to feedback loop control of an online application based on network characteristics affecting user experience.

BACKGROUND

For decades, computer networks have used Key Performance Indicator (KPIs) such as delay, loss, and jitter as proxies for the true user experience of online applications. More specifically, network administrators typically set different Service Level Agreements (SLAs) for different applications, under the assumption that there are certain KPI thresholds at which the user experience of an application becomes degraded. For instance, a voice application may be considered to give poor user experience when it violates an SLA such as: latency >300 ms or loss >3% or jitter >50 ms.

However, the link between different SLA thresholds and degraded application experience is often debatable. For example, two real-time voice calls may have different loss thresholds based on the audio codec being used a voice application that uses a lossy codec such as Opus may be resistant until a packet loss of up to 30%, where as other audio codecs such as advanced audio coding (AAC) usually is not resilient to such high loss thresholds. Thus, the relationship between the characteristics of the network and the experiences of the users of the application is often complex and not well understood.

Beyond the characteristics of the network, the configuration of the application itself can also affect the application experience of its users. In addition, certain application parameters may be optimal under certain network conditions, but actually impinge on the application experience under other network conditions.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
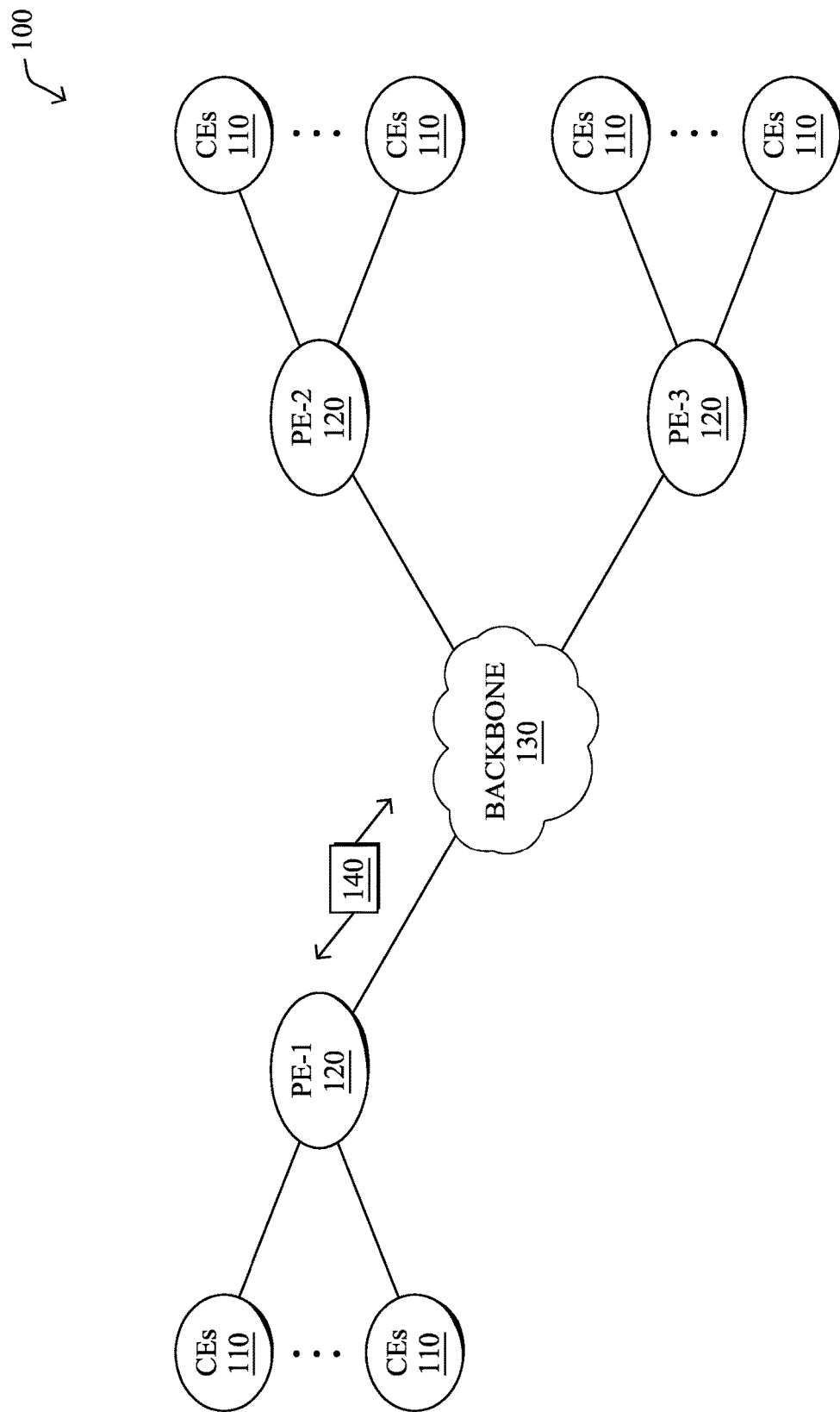
FIGS. 1A-1B illustrate an example communication network.

According to one or more embodiments of the disclosure, a device obtains a set of one or more configuration parameters of an online application accessed by a plurality of clients via a network. The device obtains path information regarding paths in the network via which the plurality of clients accesses the online application. The device determines an updated configuration parameter predicted by a prediction model to increase application experience of the online application based on the path information and the set of one or more configuration parameters. The device provides the updated configuration parameter for use by the online application.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
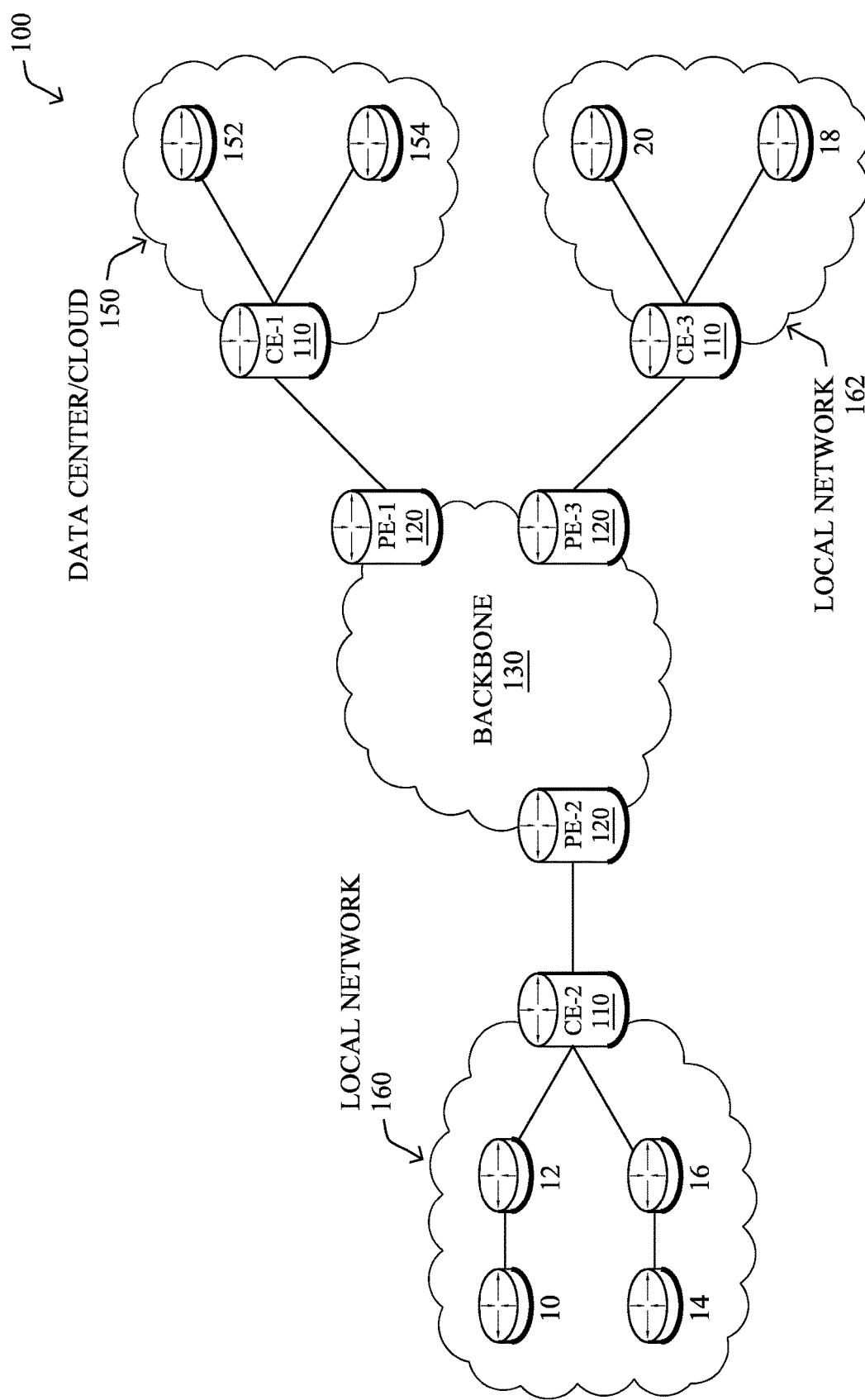

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
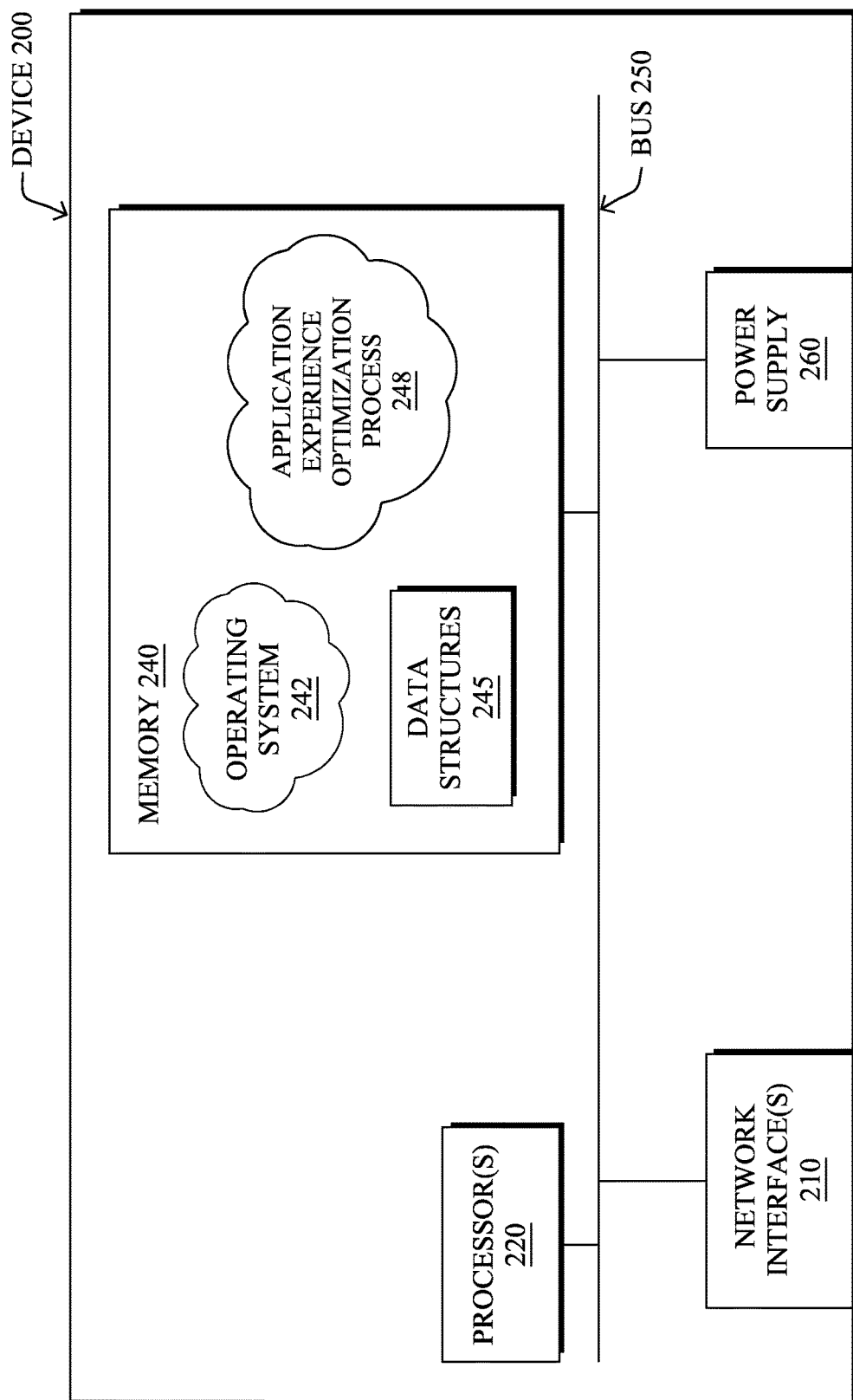
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
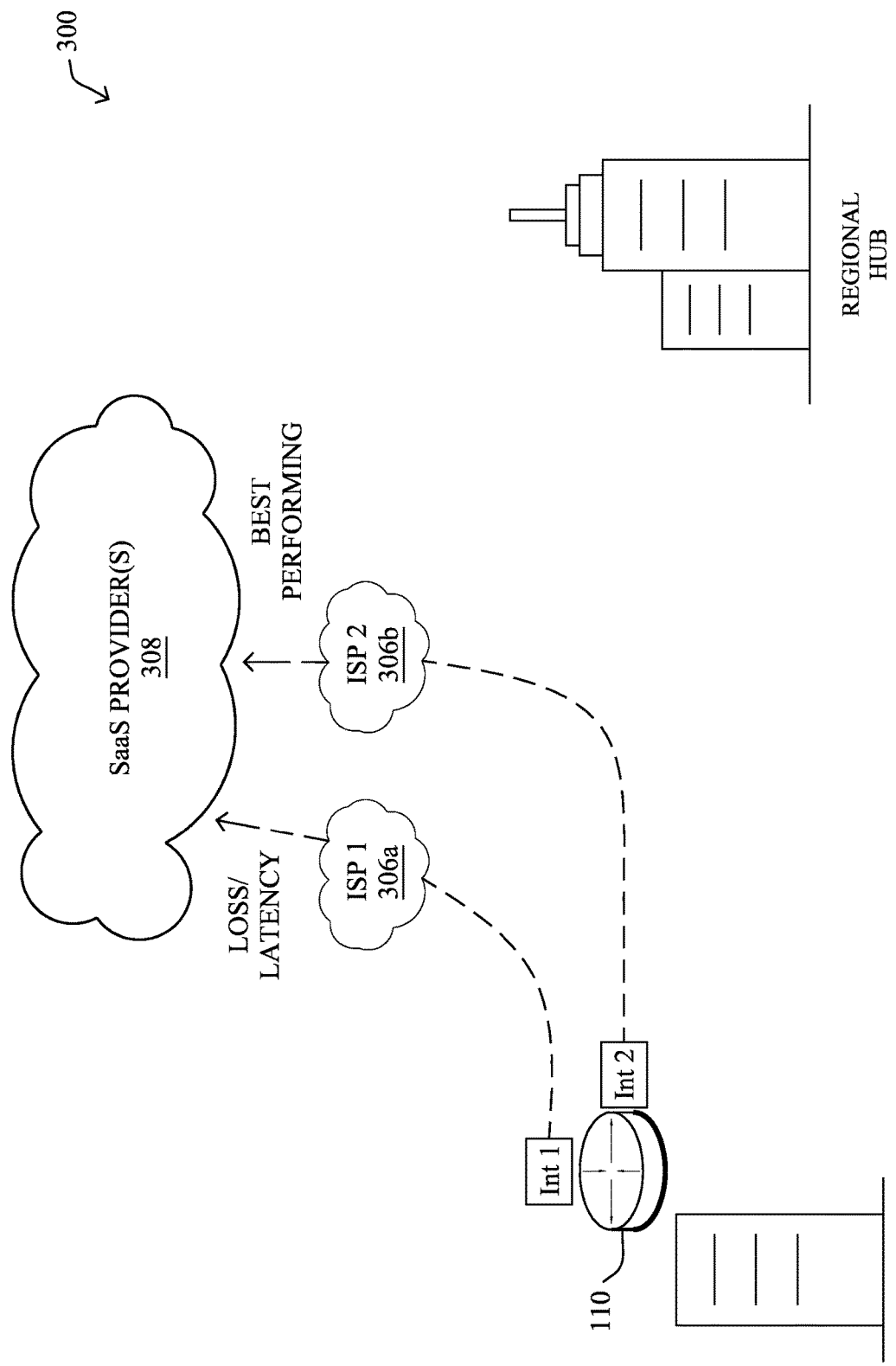
FIGS. 3A-3B illustrate example network deployments.
Figure 3B:
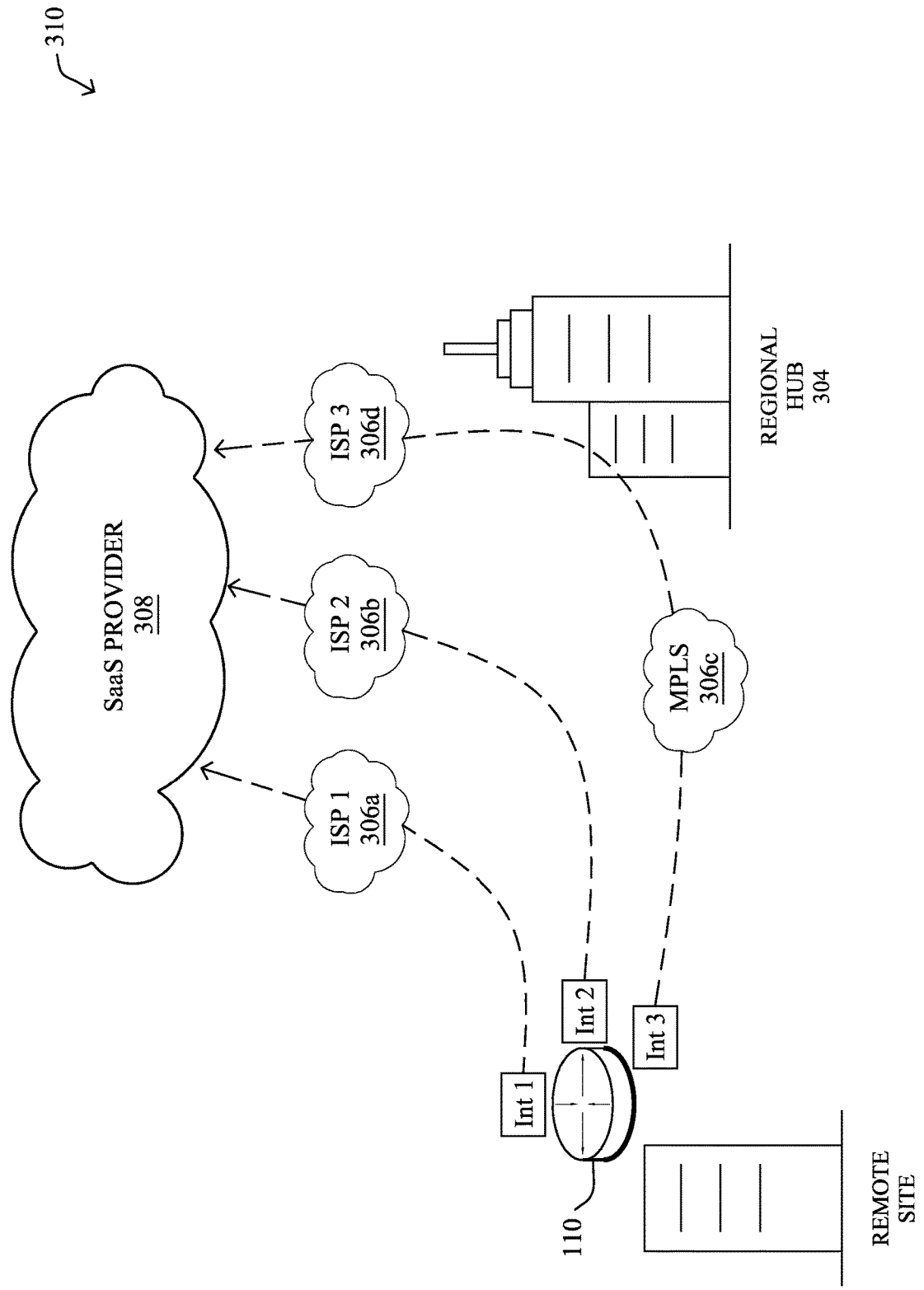

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL. 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
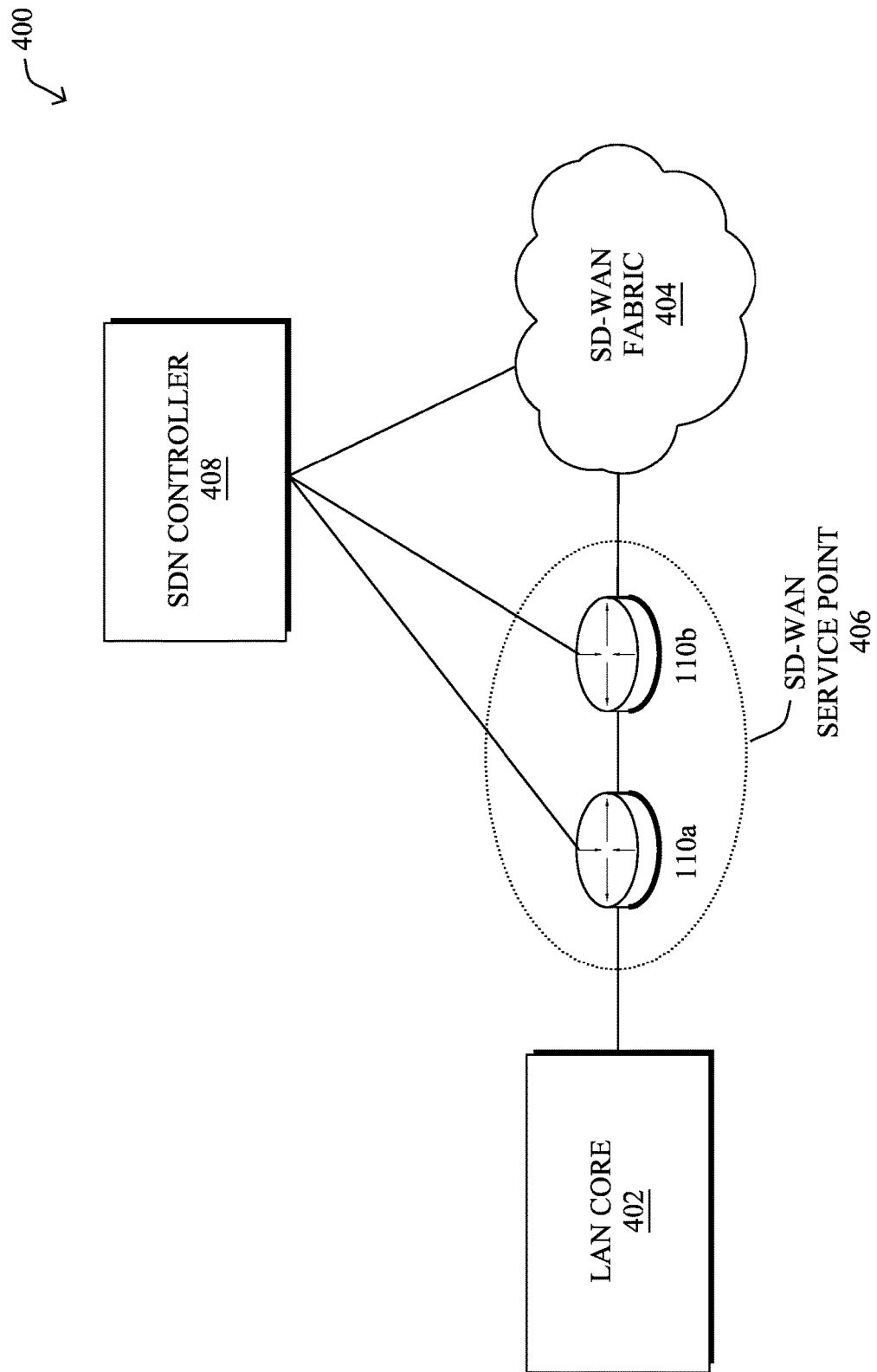
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance. SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS. LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
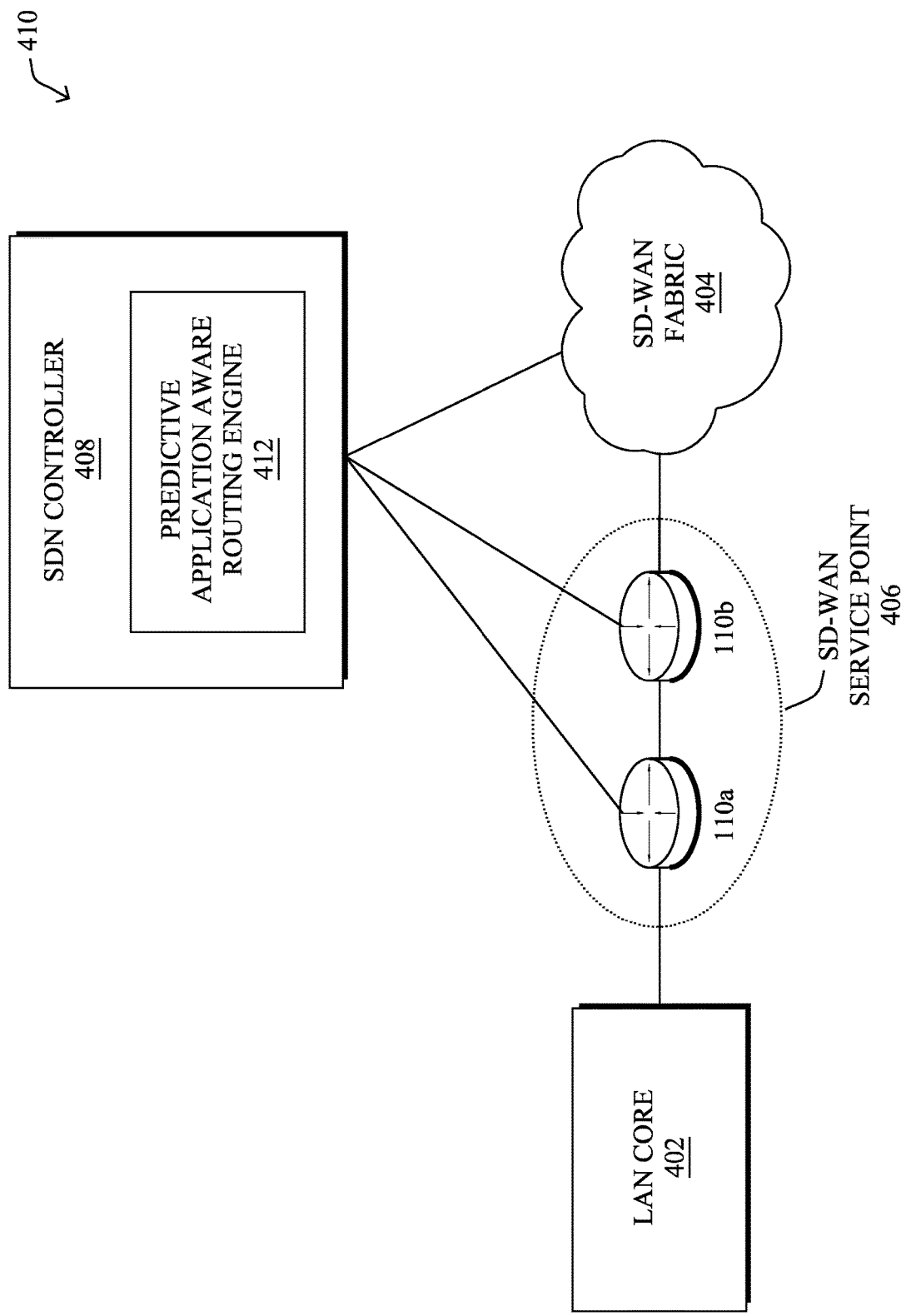

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches." which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY. MAC, etc.) independent of each other, and allowing the Internet to scale. Still, with modem applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking which focuses on single layers and poorly connect with networking actions, instead of taking a siloed approach where networking systems poorly understand user satisfaction. Cognitive Networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, the configuration parameters of an online application can also have an impact on the QoE/application experience of that application. Indeed, while it is largely assumed today that the network itself is the sole factor influencing the QoE of an application, there are also many application layer (Layer 7) specific parameters that can be tuned to make the application more or less efficient, leading to a variety of strategies that can be employed to overcome degradations at the network level. In addition, while one particular configuration parameter may improve the QoE under certain network conditions, it may also decrease it under other network conditions.

Feedback Loop Control of an Online Application

The techniques introduced herein leverage feedback regarding the network path characteristics to determine the optimal set of configuration parameter(s) for the application at any given time. Such network path characteristics can be either captured directly from the network or predicted using a prediction model (e.g., in advance of a predicted failure event).

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device obtains a set of one or more configuration parameters of an online application accessed by a plurality of clients via a network. The device obtains path information regarding paths in the network via which the plurality of clients accesses the online application. The device determines an updated configuration parameter predicted by a prediction model to increase application experience of the online application based on the path information and the set of one or more configuration parameters. The device provides the updated configuration parameter for use by the online application.

Figure 5:
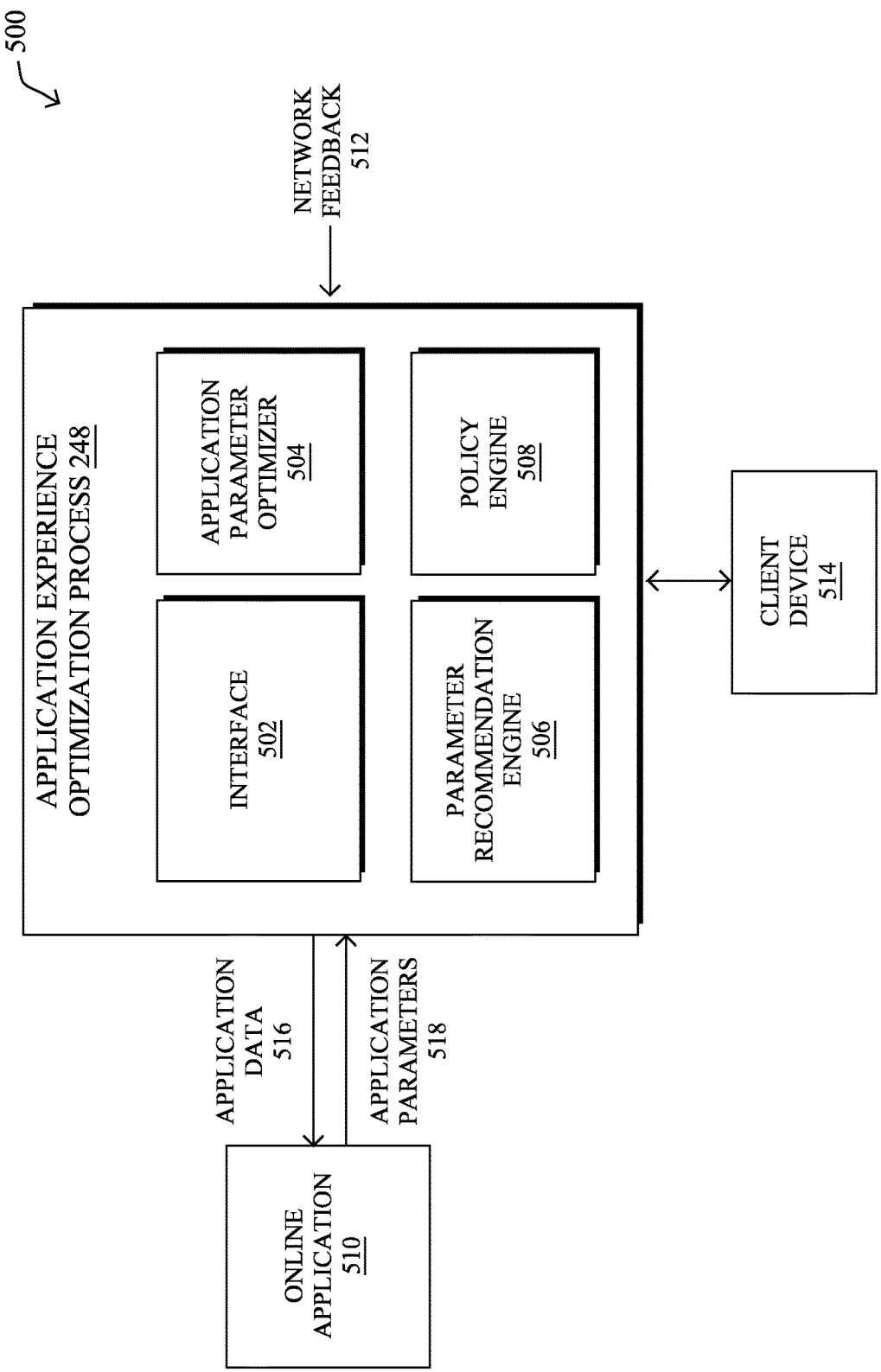
FIG. 5 illustrates an example architecture for feedback loop control of an online application based on network characteristics affecting user experience.

Operationally, FIG. 5 illustrates an example architecture for feedback loop control of an online application based on network characteristics affecting user experience, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, application experience optimization process 248 may be used to implement a predictive application aware routing engine, such as predictive application aware routing engine 412, or another supervisory service for the network. In further embodiments, application experience optimization process 248 may be used to provide a recommendation service to client devices in a network, such as client device 514.

As shown, application experience optimization process 248 may include any or all of the following components: an interface 502, an application parameter optimizer 504, a parameter recommendation engine 506, and/or a policy engine 508. As would be appreciated, the functionalities of these components may be combined or omitted, as desired (e.g., implemented as part of application experience optimization process 248).

In addition, these components may be implemented on a singular device or in a distributed manner, in which case the combination of executing devices can be viewed as their own singular device for purposes of executing application experience optimization process 248.

In various embodiments, interface 502 may take the form of an application programming interface (API) between online application 510 (e.g., a route server of a collaboration application, etc.) and the network controller (e.g., SDN controller 408, etc.) in charge of the routing/path selection. In the case of 'classic' Internet routing, the engine may be a route reflector, whereas in SD-WAN network such engine may take the form of vManage/vSmart for Cisco SD-WAN Viptela.

In one embodiment, interface 502 may also allow for the routing engine to provide network feedback and suggested configuration parameter adjustments to online application 510 so as to improve the use experience. Note that this is in contrast with an approach whereby the network controller gets feedback from the application in order to adapt the network routing. Instead, in the present case, the network controller provides network feedback 512 to application experience optimization process 248 about the network path characteristics for the paths via which traffic for online application 510 is sent, in order to trigger application layer changes.

In some embodiments, interface 502 may also be extended to communicate with a predictive routing system that provides network feedback 512 in the way of predictions. For instance, as detailed previously, such a system may predict network metrics (e.g., loss, delay, jitter, throughput, etc.) of a given path and, potentially, expected issues or other impairments predicted for that path.

According to various embodiments, application parameter optimizer 504 may take as input application data 516 from online application 510 and network feedback 512, to determine the optimal setting for a given configuration parameter of online application 510. In various embodiments, such input data may include any or all of the following:

- The current list of active paths for a given set of critical (SaaS and non SaaS applications) indicated by network feedback 512. In the case of SD-WAN, the list of paths could be the list of tunnels for backhauling the traffic from a vedge to the Gateway; in the case of SaaS applications (Cloud on Ramp) the path may be from vEdge to the SaaS IP server. In the classic case of routing over the Internet the path is obtained from eBGP session on an autonomous system boundary router (ASBR).
- A set of labels in application data 516 reflecting the current application experience of online application 510. For example, with O365, several types of information are provided by Microsoft such as the probability density function (PDF) for delay and loss experienced by the O365 client to the entry point of the Microsoft network, as well as a label reflecting the true user experience as computed by Microsoft with four discrete values: GOOD, DEGRADED, BAD, and NO OPINION. In the case of the Webex, the label is a continuous variable reflecting the mean opinion score (MoS), which is computed internally based on the concealment time. Of course, such QoE/application experience metrics could also be based on user provided ratings, as well.
- The current set of one or more application parameters in use by online application 510 indicated by input application data 516. As would be appreciated, such parameters may be specific to online application 510 or its type of application. For instance, in the case of a collaboration application used to share audio and/or video between clients, the configuration parameters of the application may control when or how FEC is used for the traffic of the application, a resolution of the application (e.g., a codec, video, or audio resolution, buffer sizes of buffers of the application, or the like.

According to various embodiments, application parameter optimizer 504 may use any or all of the above as input to a machine learning-based prediction model, to predict the application experience given the path metrics for the paths in use (e.g., actual or predicted metrics) and the possible configuration parameter(s) of online application 510. This allows the model to assess the impact of different configuration parameter settings for online application 510, while taking into account the future or current path conditions, to determine the 'optimal' parameter setting.

By way of example, some applications make use of an error correction mechanism, such as forward error correction (FEC), which helps to protect against packet loss. In other cases, the application may even go to the extreme of employing packet duplication to overcome such packet loss by sending multiple copies of the same data stream to the receiver, so that the receiver can reconstruct an error free copy of the stream. However, both of these approaches are also not without cost, as both also increase the bandwidth consumption of the application traffic. If the bandwidth consumption then exceeds the available bandwidth of the path, this could actually have a detrimental effect on the application experience. Thus, application parameter optimizer 504 may select to enable FEC or packet duplication by online application 510 for certain paths and under certain network conditions (e.g., when the additional bandwidth needed is unavailable, when the loss along the path is minimal, etc.), while disabling it at other times, through control of one or more application parameters 518.

In another example, consider packet jitter, which can significantly degrade both audio and video quality. Most collaboration applications overcome jitter issues by provisioning packet buffers on the receiver side, allowing for the collection and reordering of incoming packets before being passed on to the audio/video codec decoder. Even so, the size of the provisioned buffers needs to be carefully managed, as the larger the buffer size, the more delay is introduced in the audio/video stream, which can lead to other issues such as crosstalk where users end up talking over each other. Conversely, provisioning buffers that are too small can cause packets to be processed out of order, causing significant degradations. Thus, in this instance, application parameter optimizer 504 may seek the optimal buffer size application parameters 518 for online application 510, taking into account the existing or predicted jitter along the network path(s).

Yet another example relates to the resolution used for video streams. Typically, collaboration applications initially start by requesting and transmitting the highest available video resolution, and subsequently downgrade it in the case of issues until a steady state is reached. Nonetheless, identifying the optimum video resolution can take some time, during which users may end up seeing various types of degradations such as choppy or grainy video. Here, application parameter optimizer 504 could use its model to quickly identify the optimal resolution one or more application parameters 518 for online application 510, given the current or future path metrics from the network.

In various embodiments, parameter recommendation engine 506 may be configured to provide a set of application parameters 518 recommended for the path in use. For example, application parameter optimizer 504 might determine that, for the path in use, the system should modify the parameters setting for all applications between a given city (source) and Webex server or SaaS application server, in order to optimize the user experience. Application parameter optimizer 504 may then keep sending refreshed application parameter settings as path changes over SD-WAN or in the Internet. To do so, parameter recommendation engine 506 may employ various strategies that would trigger updates sent to the application servers (e.g. send new parameters, if and only if the estimated application experience would be improved by at least x %, the MoS experience improvements involves at least Y customers, etc.

As would be appreciated, parameter recommendation engine 506 may also provide the recommended one or more application parameters 518 to client device 514 for display. Thus, in some embodiments, parameter recommendation engine 506 may provide fully automated control over the configuration parameters of online application 510 and allowing a user of client device 514 to review such changes. However, in other embodiments, parameter recommendation engine 506 may first seek approval from the user of client device 514 before implementing the recommended change(s).

Finally, policy engine 508 may be configured to determine when application parameter tuning should be performed based on the updated configuration parameters computed by application parameter optimizer 504. For example, the user of client device 514 may decide that the parameters for Webex should be changed in a given region if application parameter optimizer 504 determines that a new setting of such parameters would improve the performance by x % (using the yser experience score or the MOS score), thus positively impacting N users for a given region. If the predictive routing system is available, an additional conditional could be added if application parameter optimizer 504 determines that such improvement would persist for a given (long enough) period of time, while taking into account the predictions for the network characteristics, volume of traffic, number of users, etc.

Figure 6:
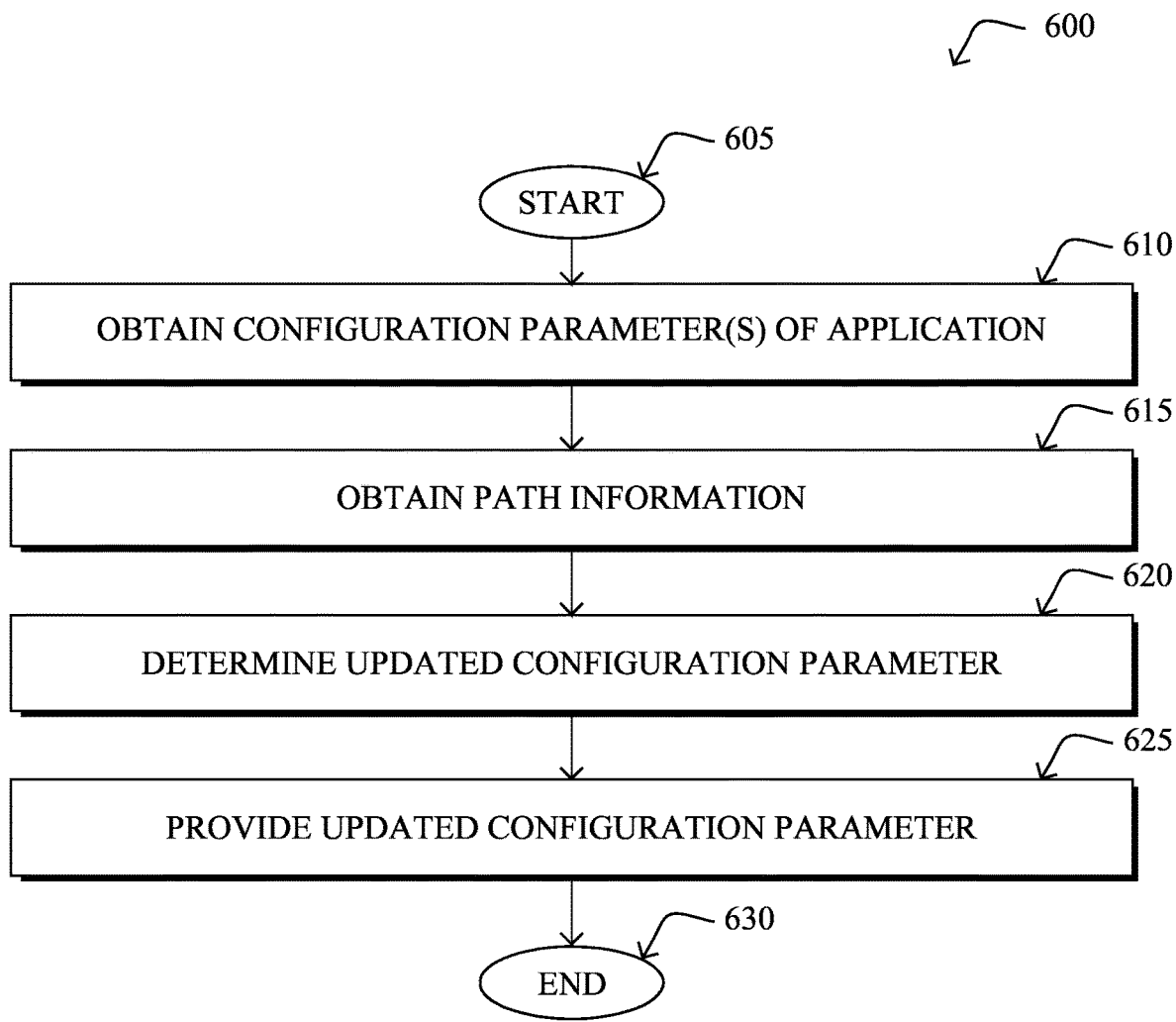
FIG. 6 illustrates an example simplified procedure for feedback loop control of an online collaboration application based on network characteristics affecting user experience.

FIG. 6 illustrates an example simplified procedure (e.g., a method) for feedback loop control of an online application based on network characteristics affecting user experience, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 600 by executing stored instructions (e.g., application experience optimization process 248). The procedure 600 may start at step 605, and continues to step 610, where, as described in greater detail above, the device may obtain a set of one or more configuration parameters of an online application accessed by a plurality of clients via a network. In some embodiments, the online application is a collaboration application via which the plurality of clients exchange audio or video data.

At step 615, as detailed above, the device may obtain path information regarding paths in the network via which the plurality of clients accesses the online application. In some embodiments, the path information comprises predicted delay, loss, or jitter metrics for the paths.

At step 620, the device may determine an updated configuration parameter predicted by a prediction model to increase application experience of the online application based on the path information and the set of one or more configuration parameters, as described in greater detail above. In various embodiments, the updated configuration parameter controls use of forward error correction (FEC) by the online application. In some embodiments, the updated configuration parameter controls a size of a buffer of the online application. In further embodiments, the updated configuration parameter controls a resolution of the online application. In one embodiment, the prediction model is trained using application experience metrics reported by the online application.

At step 625, as detailed above, the device may provide the updated configuration parameter for use by the online application. In one embodiment, the device provides the updated configuration parameter based in part on a defined policy that specifies a geographic location in which the plurality of clients is located. In a further embodiment, the device provides the updated configuration parameter to a user interface for display. In another embodiment, the device provides the updated configuration parameter based on a predicted amount of increase to the application experience of the online application.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for feedback loop control of a collaboration application based on network characteristics affecting user experience, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:
1. A method comprising:
obtaining, by a device, a set of one or more configuration parameters of an online application accessed by a plurality of clients via a network;

obtaining, by the device, path information regarding paths in the network via which the plurality of clients accesses the online application;

determining, by the device, an updated configuration parameter predicted by a prediction model to increase application experience of the online application based on the path information and the set of one or more configuration parameters, wherein the updated configuration parameter controls use of forward error correction (FEC) by the online application, a size of a buffer of the online application, or a resolution of the online application; and providing, by the device, the updated configuration parameter for use by the online application.

2. The method as in claim 1, wherein the online application is a collaboration application via which the plurality of clients exchange audio or video data.

3. The method as in claim 1, wherein the device provides the updated configuration parameter based in part on a defined policy that specifies a geographic location in which the plurality of clients is located.

4. The method as in claim 1, wherein the device provides the updated configuration parameter to a user interface for display.

5. The method as in claim 1, wherein the prediction model is trained using application experience metrics reported by the online application.

6. The method as in claim 1, wherein the path information comprises predicted delay, loss, or jitter metrics for the paths.

7. The method as in claim 1, wherein the device provides the updated configuration parameter based on a predicted amount of increase to the application experience of the online application.

8. An apparatus, comprising:
one or more network interfaces;
a processor coupled to the one or more network interfaces and configured to execute one or more processes; and
a memory configured to store a process that is executable by the processor, the process when executed configured to:
obtain a set of one or more configuration parameters of an online application accessed by a plurality of clients via a network;
obtain path information regarding paths in the network via which the plurality of clients accesses the online application;
determine an updated configuration parameter predicted by a prediction model to increase application experience of the online application based on the path information and the set of one or more configuration parameters, wherein the updated configuration parameter controls use of forward error correction (FEC) by the online application, a size of a buffer of the online application, or a resolution of the online application; and
provide the updated configuration parameter for use by the online application.

9. The apparatus as in claim 8, wherein the online application is a collaboration application via which the plurality of clients exchange audio or video data.

10. The apparatus as in claim 8, wherein the apparatus provides the updated configuration parameter based in part on a defined policy that specifies a geographic location in which the plurality of clients is located.

11. The apparatus as in claim 8, wherein the apparatus provides the updated configuration parameter to a user interface for display.

12. The apparatus as in claim 8, wherein the prediction model is trained using application experience metrics reported by the online application.

13. The apparatus as in claim 8, wherein the path information comprises predicted delay, loss, or jitter metrics for the paths.

14. A tangible, non-transitory, computer-readable medium storing program instructions that cause a device to execute a process comprising:
obtaining, by the device, a set of one or more configuration parameters of an online application accessed by a plurality of clients via a network;
obtaining, by the device, path information regarding paths in the network via which the plurality of clients accesses the online application;
determining, by the device, an updated configuration parameter predicted by a prediction model to increase application experience of the online application based on the path information and the set of one or more configuration parameters, wherein the updated configuration parameter controls use of forward error correction (FEC) by the online application, a size of a buffer of the online application, or a resolution of the online application; and
providing, by the device, the updated configuration parameter for use by the online application.

\* \* \* \* \*

UNITED STATES PATENT AND TRADEMARK OFFICE
CERTIFICATE OF CORRECTION

| | | |
|---|---|---|
| PATENT NO. | : 12,034,605 B1 | Page 1 of 1 |
| APPLICATION NO. | : 18/198583 | |
| DATED | : July 9, 2024 | |
| INVENTOR(S) | : Jean-Philippe Vasseur et al. | |

It is certified that error appears in the above-identified patent and that said Letters Patent is hereby corrected as shown below:

In the Specification

Column 10, Line 24 please amend as shown:
"patches," which are typically temporary in nature (e.g, Column 11, Line 33 please amend as shown:
allowing the Internet to scale. Still, with modern applications Signed and Sealed this
First Day of October, 2024

Katherine Kelly Vidal
*Director of the United States Patent and Trademark Office*